United States Patent
Yoshida

(10) Patent No.: US 8,717,454 B2
(45) Date of Patent: May 6, 2014

(54) IMAGE PICKUP APPARATUS AND IMAGE PICKUP METHOD FOR ADJUSTING WHITE BALANCE TO ACCOUNT FOR FLASH AND EXTERNAL LIGHT SOURCES

(75) Inventor: Takahiko Yoshida, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 12/977,900

(22) Filed: Dec. 23, 2010

(65) Prior Publication Data

US 2011/0157413 A1 Jun. 30, 2011

(30) Foreign Application Priority Data

Dec. 24, 2009 (JP) ................................. 2009-293474
Dec. 13, 2010 (KR) ........................ 10-2010-0127097

(51) Int. Cl.
 *H04N 5/228* (2006.01)
 *H04N 9/73* (2006.01)
 *H04N 5/225* (2006.01)
(52) U.S. Cl.
 CPC ............... *H04N 9/73* (2013.01); *H04N 5/2256* (2013.01)
 USPC .................... 348/222.1; 348/223.1; 348/224.1
(58) Field of Classification Search
 CPC ............................. H04N 9/73; H04N 5/2256
 USPC ........................................ 348/222.1; 396/155
 See application file for complete search history.

(56) References Cited

U.S. PATENT DOCUMENTS

| 7,002,624 | B1 * | 2/2006 | Uchino et al. | ............. 348/225.1 |
| 7,330,206 | B2 * | 2/2008 | Nishimura | ................. 348/223.1 |
| 7,903,896 | B2 | 3/2011 | Yamada | |
| 8,203,625 | B2 * | 6/2012 | Furuya et al. | ............... 348/229.1 |
| 2004/0145674 | A1 * | 7/2004 | Hoppe et al. | .................. 348/371 |
| 2005/0099529 | A1 * | 5/2005 | Hattori | .......................... 348/370 |
| 2005/0190288 | A1 * | 9/2005 | Yamada | ........................ 348/371 |
| 2005/0195290 | A1 * | 9/2005 | Takeshita | .................... 348/223.1 |
| 2005/0243175 | A1 * | 11/2005 | Yamada et al. | ............ 348/207.1 |

(Continued)

FOREIGN PATENT DOCUMENTS

| JP | 2002-369211 A | 12/2002 |
| JP | 2005-102116 A | 4/2005 |

(Continued)

OTHER PUBLICATIONS

Office Action issued for JP 2009-293474 (Jan. 28, 2014).

*Primary Examiner* — Roberto Velez
*Assistant Examiner* — Cynthia Segura
(74) *Attorney, Agent, or Firm* — Drinker Biddle & Reath LLP

(57) ABSTRACT

An image pickup apparatus includes an image pickup unit that acquires a first image without a flash and a second image with the flash; a down-sampling unit that generates a third image by down-sampling the second image; a brightness difference calculator that calculates a brightness difference between the first image and the third image; a flash reflection intensity calculator that calculates a first flash reflection intensity from the brightness difference; and a white balance gain calculator that calculates a white balance gain based on the first flash reflection intensity. An image pickup method includes acquiring a first image without a flash and a second image with the flash, generating a third image by down-sampling the second image, calculating a brightness difference between the first image and the third image, calculating a first flash reflection intensity from the brightness difference, and calculating a white balance gain.

15 Claims, 10 Drawing Sheets

(56) References Cited

U.S. PATENT DOCUMENTS

| | | |
|---|---|---|
| 2007/0165960 A1* | 7/2007 | Yamada .................... 382/254 |
| 2007/0201853 A1* | 8/2007 | Petschnigg ................ 396/155 |
| 2007/0248342 A1* | 10/2007 | Tamminen et al. .......... 396/67 |
| 2010/0013938 A1* | 1/2010 | Fukuda et al. ............ 348/208.4 |
| 2012/0147213 A1* | 6/2012 | Dalton ..................... 348/223.1 |
| 2013/0016249 A1* | 1/2013 | Mine ....................... 348/223.1 |

FOREIGN PATENT DOCUMENTS

| | | |
|---|---|---|
| JP | 2005-167476 A | 6/2005 |
| JP | 2005-347811 A | 12/2005 |
| JP | 2006-324851 A | 11/2006 |

* cited by examiner

FIG. 8

| C11 | C13 | C15 | C17 | C19 |
|-----|-----|-----|-----|-----|
| C31 | C33 | C35 | C37 | C39 |
| C51 | C53 | C55 | C57 | C59 |
| C71 | C73 | C75 | C77 | C79 |
| C91 | C93 | C95 | C97 | C99 |

| C11 | C12 | C13 | C14 | C15 | C16 |
|-----|-----|-----|-----|-----|-----|
| C21 | C22 | C23 | C24 | C25 | C26 |
| C31 | C32 | C33 | C34 | C35 | C36 |
| C41 | C42 | C43 | C44 | C45 | C46 |
| C51 | C52 | C53 | C54 | C55 | C56 |
| C61 | C62 | C63 | C64 | C65 | C66 |

IMAGE PICKUP APPARATUS AND IMAGE PICKUP METHOD FOR ADJUSTING WHITE BALANCE TO ACCOUNT FOR FLASH AND EXTERNAL LIGHT SOURCES

CROSS-REFERENCES TO RELATED PATENT APPLICATIONS

This application claims the priority benefit of Japanese Patent Application No. 2009-293474, filed on Dec. 24, 2009, in the Japanese Patent Office, and Korean Patent Application No. 10-2010-0127097, filed on Dec. 13, 2010, in the Korean Intellectual Property Office, the entire disclosures of both of which are incorporated herein by reference.

BACKGROUND

1. Field of the Invention

Embodiments generally relates to an image pickup apparatus and an image pickup method.

2. Description of the Related Art

In an electronic image pickup apparatus, such as a digital still camera, a conventional white balance correction process is a process of uniformly applying a single white balance gain to an entire image.

For example, in a scene with a low level of illumination (such as surrounding light), photographing is performed by emitting a flash to compensate for a lack of light-exposure. When photographing is performed by emitting a flash, a white balance gain is calculated according to a light intensity of the emitted flash. When a scene is captured with both surrounding light and flash light, a subject close to a digital still camera can be captured with a proper white balance. However, a subject far from the digital still camera relies on the surrounding light rather than the flash light. Thus, when a light source of the surrounding light is a fluorescent lamp, a color temperature difference between the surrounding light and the flash light can be large. As a result, when a white balance correction process is applied to an entire image, a white subject far from the digital still camera becomes yellow because an improper white balance occurs.

Japanese Patent Laid-Open Gazette No. 2005-347811 discloses technology for calculating an optimal white balance gain by interpolating a flash image and a non-flash image when an image size of the flash image is different from that of the non-flash image. According to Japanese Patent Laid-Open Gazette No. 2005-347811, the entire flash image and the entire non-flash image are each divided into a plurality of blocks; a white balance gain is calculated by comparing corresponding blocks with each other; and the calculated white balance gain is defined as a white balance gain of a central pixel of a corresponding block. A white balance gain of each non-central pixel is obtained by performing interpolation according to a distance from a central pixel of an adjacent block.

According to Japanese Patent Laid-Open Gazette No. 2005-347811, in a case of a subject having a boundary, such as an edge, if a color temperature is significantly changed in the boundary, an improper white balance gain is derived around the boundary when performing interpolation based on a distance from a central pixel.

Japanese Patent Laid-Open Gazette No. 2002-369211 discloses an interpolation method different from Japanese Patent Laid-Open Gazette No. 2005-347811. According to Japanese Patent Laid-Open Gazette No. 2002-369211, a flash image and a non-flash image are acquired by reducing numbers of pixels through down-sampling, and a color temperature condition is calculated in a unit of a pixel. When the non-flash image is a down-sampled image, a white balance gain is obtained by interpolating down-sampled pixels. A color temperature condition of a pixel to be interpolated is obtained by selecting three pixels close to the pixel to be interpolated and determining a color temperature condition of a pixel having a brightness value approximate to that of the pixel to be interpolated as the color temperature condition of the pixel to be interpolated. A white balance gain of the pixel to be interpolated is obtained from the obtained color temperature condition.

According to Japanese Patent Laid-Open Gazette No. 2002-369211, while interpolation is being properly performed for a subject having a boundary, such as an edge, an occurrence of image streaking in which a white balance gain is frequently changed causes interpolation to be unnaturally performed.

That is, when a non-flash image, such as a live-view image, having a smaller number of pixels than a flash image is used, a white balance gain of a down-sampled pixel is obtained by interpolation. However, a proper white balance gain cannot be obtained by interpolation based on a distance between pixels or using a pixel value of an adjacent pixel as it is.

Therefore, there is a need in the art for an apparatus or a method of providing an entire image with proper white balance.

SUMMARY

Accordingly, for an entire image to have a proper white balance, there is disclosed technology for calculating a reflected light intensity of a flash by comparing a flash image and a non-flash image, calculating an optimal white balance gain in a unit of a pixel from the reflected light intensity of the flash, and applying the optimal white balance gain to the entire image.

Embodiments include an image pickup apparatus and a method of properly adjusting a white balance of an entire image by properly interpolating down-sampled pixels in a method of calculating a white balance gain in a unit of a pixel by comparing a non-flash image having a small number of pixels with a flash image, or a main captured image, having a large number of pixels.

According to an embodiment, an image pickup apparatus includes an image pickup unit that acquires a first image without a flash by a down-sampling process and acquires a second image with the flash, wherein the second image has a larger number of pixels than the first image; a down-sampling unit that acquires a third image by performing a down-sampling process on the second image in such a way that a size of the second image is the same as a size of the first image; a subject brightness calculator that calculates a first subject brightness for all pixels of the first image and calculates a second subject brightness for all pixels of the third image; a subject brightness difference calculator that calculates a subject brightness difference, wherein the subject brightness difference corresponds to a difference between the first subject brightness for all the pixels of the first image and the second subject brightness for all the pixels of the third image; a flash reflection intensity calculator that calculates a first flash reflection intensity in a unit of a pixel from the subject brightness difference; a first flash reflection intensity interpolator that calculates a second flash reflection intensity through interpolation to reduce an influence of a position mismatch between the first image and the third image for the first flash reflection intensity in a unit of a pixel by using pixel-based brightness values of the third image; a second flash reflection intensity interpolator that calculates a third flash reflection intensity through interpolation to magnify a size of the third image to the size of the second image for the second flash reflection intensity in a unit of a pixel by using pixel-based brightness values of the second image; and a white balance gain calculator that calculates a white balance gain in a unit of a pixel from the third flash reflection intensity.

The image pickup apparatus may further include a white balance controller that controls a white balance in a unit of a pixel by applying the white balance gain to all the pixels of the second image in a unit of a pixel.

The image pickup apparatus may further include a light-exposure control value calculator that calculates a first light-exposure control value for the first image and a second light-exposure control value for the second image; and a light-exposure control value difference calculator that calculates a light-exposure control value difference, wherein the light-exposure control value difference corresponds to a difference between the first light-exposure control value and the second light-exposure control value, for all pixels, wherein the image pickup unit acquires the first image by performing photographing based on the first light-exposure control value and acquires the second image by performing photographing based on the second light-exposure control value.

The first light-exposure control value and the second light-exposure control value can be independently calculated by the light-exposure control value calculator.

The image pickup unit may acquire the second image by performing photographing with the second light-exposure control value and an iris value of the second light-exposure control value may be updated to correspond to an iris value of the first light-exposure control value calculated by the light-exposure control value calculator.

The image pickup apparatus may further include a color balance calculator that calculates a color balance of a corresponding pixel by linear-interpolating a color balance with respect to surrounding light and a color balance with respect to flash light based on the first flash reflection intensity calculated by the flash reflection intensity calculator, wherein the white balance gain calculator calculates the white balance gain based on the color balance of the corresponding pixel, the color balance with respect to the surrounding light, and the color balance with respect to the flash light.

The first flash reflection intensity interpolator may calculate the second flash reflection intensity based on brightness values of interpolation source pixels located at upper, lower, left, and right sides of and centered around a pixel to be interpolated and the first flash reflection intensity.

For the first flash reflection intensity interpolator, a distance between the pixel to be interpolated and each of the interpolation source pixels located at the upper, lower, left, and right sides of the pixel to be interpolated may be constant.

Another embodiment includes an image pickup method. The method includes acquiring a first image without a flash by a down-sampling process and acquiring a second image with the flash, wherein the second image has a larger number of pixels than the first image; acquiring a third image by performing a down-sampling process on the second image in such a way that a size of the second image is the same as a size of the first image; calculating a first subject brightness for all pixels of the first image and calculating a second subject brightness for all pixels of the third image; calculating a subject brightness difference, wherein the subject brightness difference corresponds to a difference between the first subject brightness for all the pixels of the first image and the second subject brightness for all the pixels of the third image; calculating a first flash reflection intensity in a unit of a pixel from the subject brightness difference; calculating a second flash reflection intensity through interpolation to reduce an influence of a position mismatch between the first image and the third image for the first flash reflection intensity in a unit of a pixel by using pixel-based brightness values of the third image; calculating a third flash reflection intensity through interpolation to magnify a size of the third image to the size of the second image for the second flash reflection intensity in a unit of a pixel by using pixel-based brightness values of the second image; and calculating a white balance gain in a unit of a pixel from the third flash reflection intensity.

Another embodiment includes an image pickup apparatus. The image pickup apparatus includes an image pickup unit that acquires a first image without a flash and a second image with the flash, wherein the second image has a larger number of pixels than the first image; a down-sampling unit that generates a third image by down-sampling the second image to a size of the first image; a brightness difference calculator that calculates a brightness difference between the first image and the third image; a flash reflection intensity calculator that calculates a first flash reflection intensity in a unit of a pixel from the brightness difference; and a white balance gain calculator that calculates a white balance gain based on the first flash reflection intensity.

The image pickup apparatus may further include a first flash reflection intensity interpolator that calculates a second flash reflection intensity through interpolation to reduce an influence of a position mismatch between the first image and the third image for the first flash reflection intensity, wherein the white balance gain calculator calculates the white balance gain based on the second flash reflection intensity.

The image pickup apparatus may further include a second flash reflection intensity interpolator that calculates a third flash reflection intensity through interpolation to magnify a size of the third image to a size of the second image for the second flash reflection intensity by using pixel-based brightness values of the second image, wherein the white balance gain calculator calculates the white balance gain based on the third flash reflection intensity.

The image pickup apparatus may further include a white balance controller that controls a white balance in a unit of a pixel by applying the white balance gain to all pixels of the second image in a unit of a pixel.

Another embodiment includes an image pickup method. The method includes acquiring a first image without a flash and a second image with the flash, wherein the second image has a larger number of pixels than the first image, generating a third image by down-sampling the second image to a size of the first image, calculating a brightness difference between the first image and the third image, calculating a first flash reflection intensity in a unit of a pixel from the brightness difference, and calculating a white balance gain based on the first flash reflection intensity.

The image pickup method may further include calculating a second flash reflection intensity through interpolation to reduce an influence of a position mismatch between the first image and the third image for the first flash reflection intensity, wherein the calculating of the white balance gain includes calculating the white balance gain based on the second flash reflection intensity.

The image pickup method may further include calculating a third flash reflection intensity through interpolation to magnify a size of the third image to a size of the second image for the second flash reflection intensity by using pixel-based brightness values of the second image, wherein the calculating of the white balance gain includes calculating the white balance gain based on the third flash reflection intensity.

The image pickup method may further include controlling a white balance in a unit of a pixel by applying the white balance gain to all pixels of the second image in a unit of a pixel.

According to the exemplary embodiments, an entire image can be adjusted to have a proper white balance by properly performing interpolation for down-sampled pixels in a method of calculating a white balance gain in a unit of a pixel by comparing a non-flash image having a small number of pixels with a flash image, or a main captured image, having a large number of pixels.

BRIEF DESCRIPTION OF THE DRAWINGS

The above and other features and advantages will become more apparent by describing in detail exemplary embodiments with reference to the attached drawings in which:

FIG. 8 is a diagram of a pixel to be interpolated and interpolation source pixels;

FIG. 11 is a diagram of a pixel to be interpolated and interpolation source pixels.

DETAILED DESCRIPTION

Figure 1:
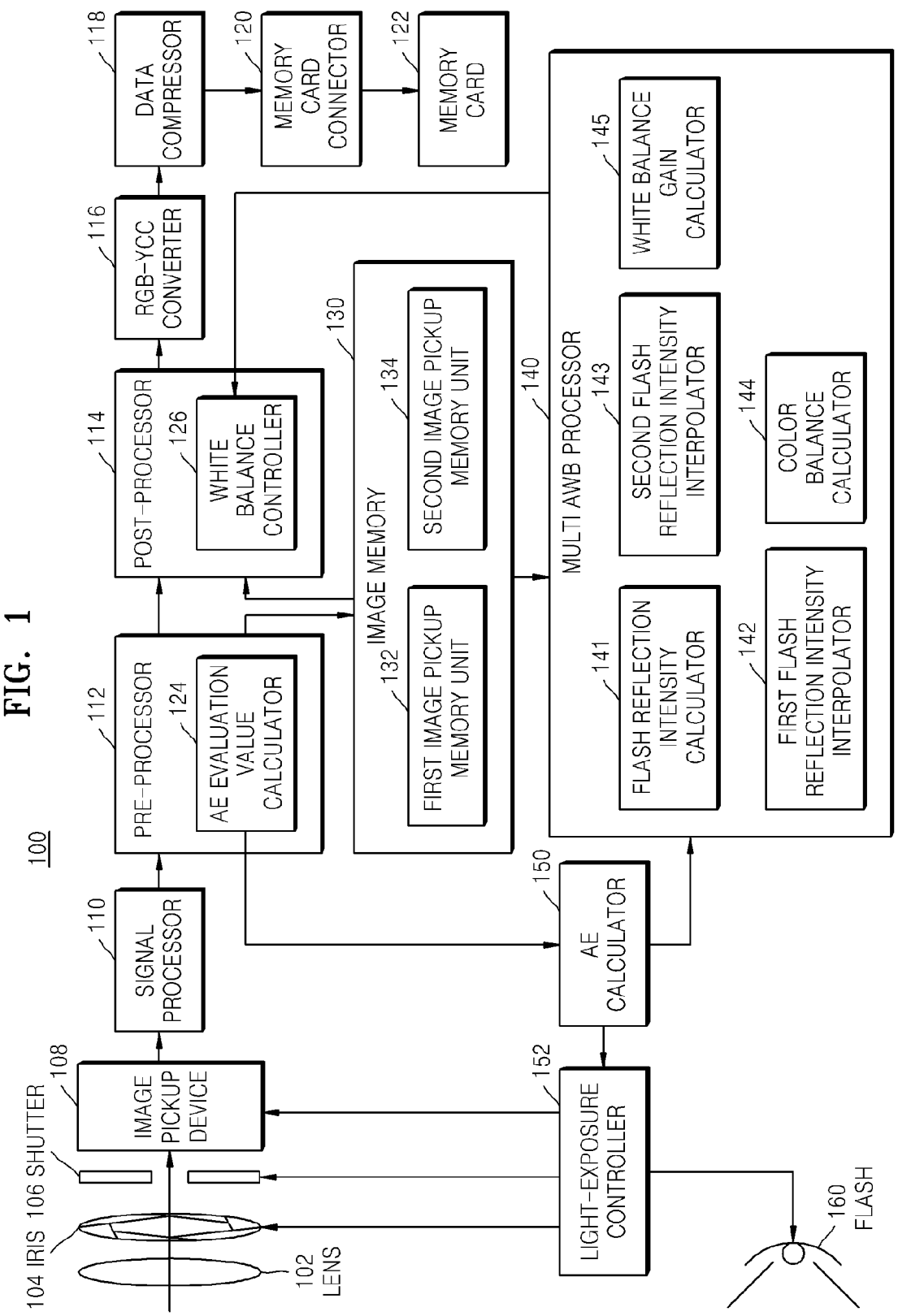
FIG. 1 is a block diagram of an image pickup apparatus according to an exemplary embodiment.

Exemplary embodiments will now be described more fully with reference to the accompanying drawings, in which the exemplary embodiments are shown.

The description below and the accompanying drawings are to help understand operations according to various embodiments, and parts that can be easily implemented by those of ordinary skill in the art may be omitted. Furthermore, like or corresponding reference numerals in the drawings denote like elements, and thus their description may not be repeated.

Figure 2A:
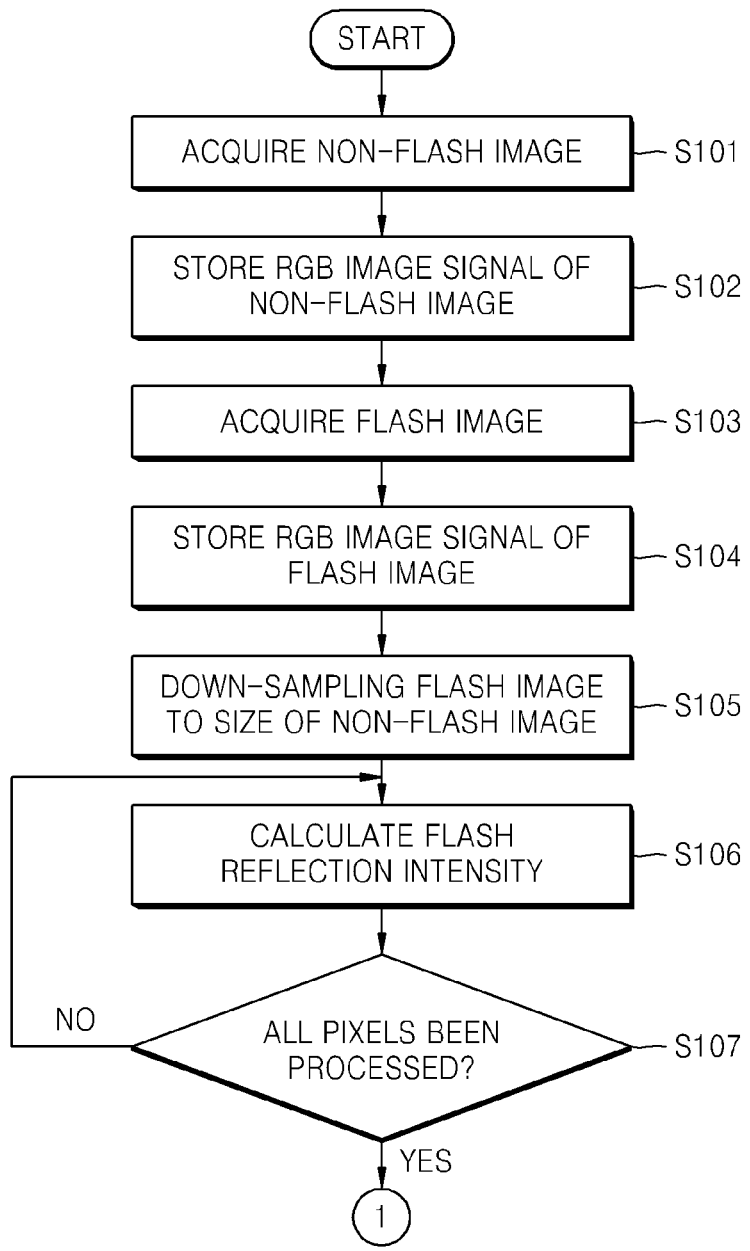
FIGS. 2A and 2B are flowcharts of a process of calculating a white balance gain, according to an exemplary embodiment.
Figure 2B:
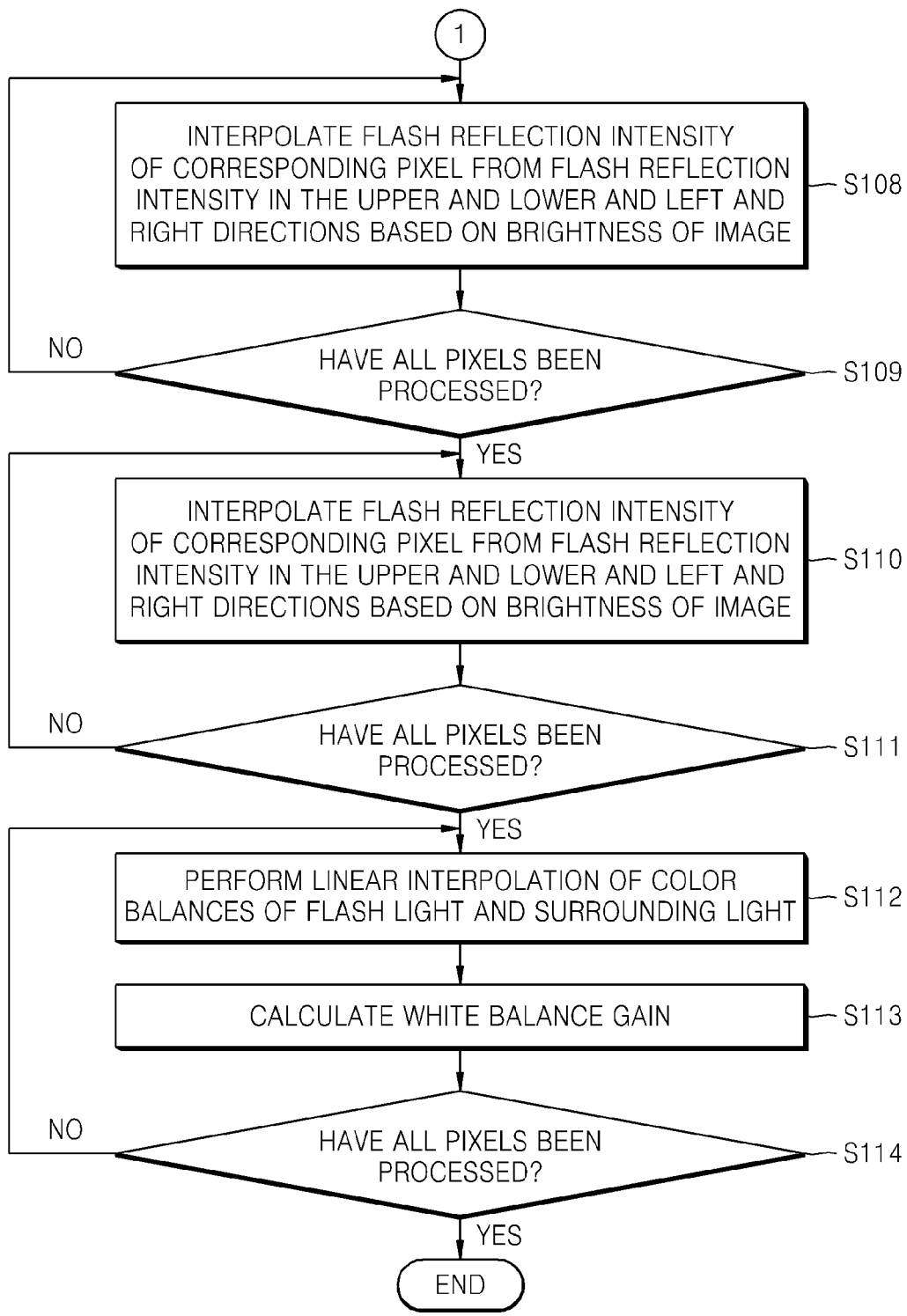

FIG. 1 is a block diagram of an image pickup apparatus 100 according to an exemplary embodiment of the present invention. FIGS. 2A and 2B are flowcharts of a process of calculating a white balance gain of the image pickup apparatus 100, according to an exemplary embodiment of the present invention.

Light transmitted through a lens 102 may form an image on an image pickup device 108, such as a Charge Coupled Device (CCD) image sensor or a Complementary Metal Oxide Semiconductor (CMOS) image sensor. An RGB image signal can be obtained from the image pickup device 108 by passing through a signal processing unit 110. The signal processing unit 110 can perform a color separation process and Analog-to-Digital (A/D) conversion for a signal from the image pickup device 108.

Processing, such as defect pixel correction, gray level correction, and shading correction, can be performed by a pre-processor 112 for the RGB image signal obtained from the signal processing unit 110. The pre-processor 112 can include an Automatic Exposure (AE) evaluation value calculator 124 that can calculate an AE evaluation value based on the RGB image signal. The AE evaluation value can be provided to an AE calculator 150. When actual photographing is performed, a light-exposure controller 152 can adjust an iris 104 and a shutter 106 based on an AE value calculated by the AE calculator 150.

Various kinds of image processing, such as white balance correction processing, Bayer color interpolation (demosaicing) processing, color correction processing, edge emphasis processing, gamma correction processing, and noise reduction processing, can be performed by a post-processor 114 for the RGB image signal processed by the pre-processor 112. Thereafter, the RGB image signal can be converted to a YCC image signal by a YCC converter 116 and can be compressed into a format, such as Joint Photographic Experts Group (JPEG), by a data compressor 118. Thereafter, image data can be recorded in a memory card 122 through a memory card connector 120. The memory card connector 120 can interface the memory card 122 with the image pickup apparatus 100.

An embodiment has a feature of calculating a proper white balance gain in a unit of a pixel for a flash image acquired by photographing with light emission from a flash 160. A photographing operation of the image pickup apparatus 100 according to the embodiment will now be described.

Photographing can start when a user pushes a shutter button. A case requiring flash light according to a light-exposure condition is described. When flash light is required according to a light-exposure condition, photographing is achieved once by performing non-flash photographing without light emission from the flash 160 and flash photographing with light emission from the flash 160.

Figure 6:
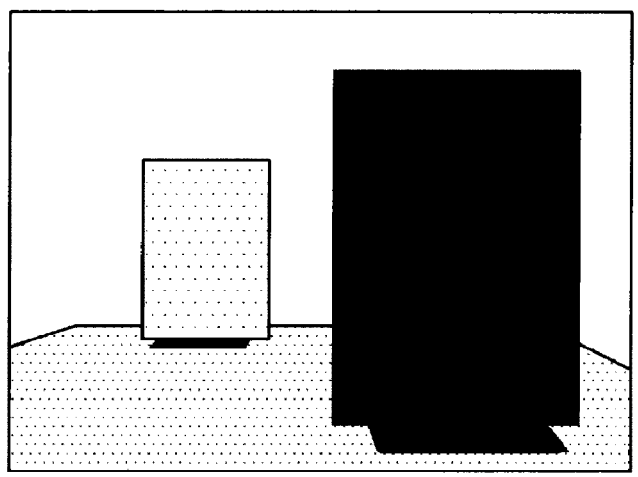
FIG. 6 illustrates an image acquired by photographing without a flash.

First, a non-flash image can be acquired by photographing without light emission from the flash 160 in operation S101. A first image pickup without light emission from the flash 160 can be achieved by obtaining a first image obtained as an RGB image signal using only surrounding light as shown in FIG. 6. The first image can be stored in a memory means, such as a first image pickup memory unit 132 of an image memory 130, in operation S102. The first image, such as a live-view image, can have a smaller image size than a size of a main captured image due to a down-sampling process.

Figure 5:
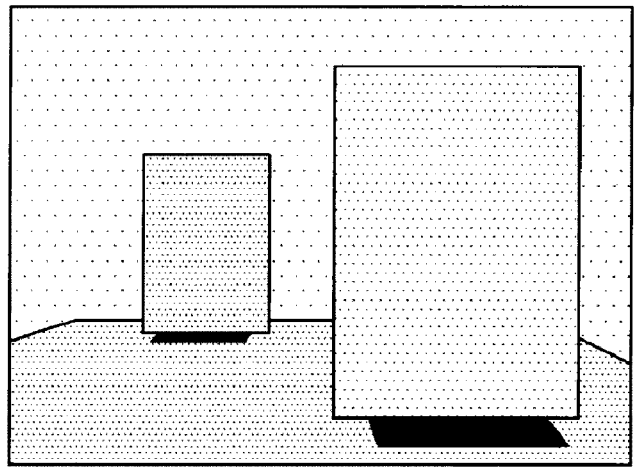
FIG. 5 illustrates an image acquired by photographing with a flash.

A second image obtained as an RGB image signal after light emission from the flash 160 as shown in FIG. 5 can be acquired by a second image pickup performed by photographing with light emission from the flash 160 in operation S103. The second image can be stored in a memory means, such as a second image pickup memory unit 134 of the image memory 130, in operation S104.

A color balance calculator 144 of a multi Automatic White Balance (AWB) processor 140 can calculate a color balance from an input image signal. The color balance calculator 144 can calculate color balances CBer (=R/G) and CBeb (=B/G) without light emission from the flash 160 or a case in which only surrounding light is used, for color component units of an RGB image signal, i.e., for R, G, and B, of a non-flash image. Simultaneously, the color balance calculator 144 can read data previously stored in a Read Only Memory (ROM) from the ROM to read color balances CBfr and CBfb of a case without surrounding light, that is, a case in which only flash light is used, as reference values.

An input value of the multi AWB processor 140 can include the RGB image signal obtained without light emission from the flash 160 and the RGB image signal obtained with light emission from the flash 160. An output value of the multi AWB processor 140 can be a white balance gain of each of all pixels. A white balance controller 126 can apply a white balance gain to all pixels in a unit of a pixel.

Figure 3:
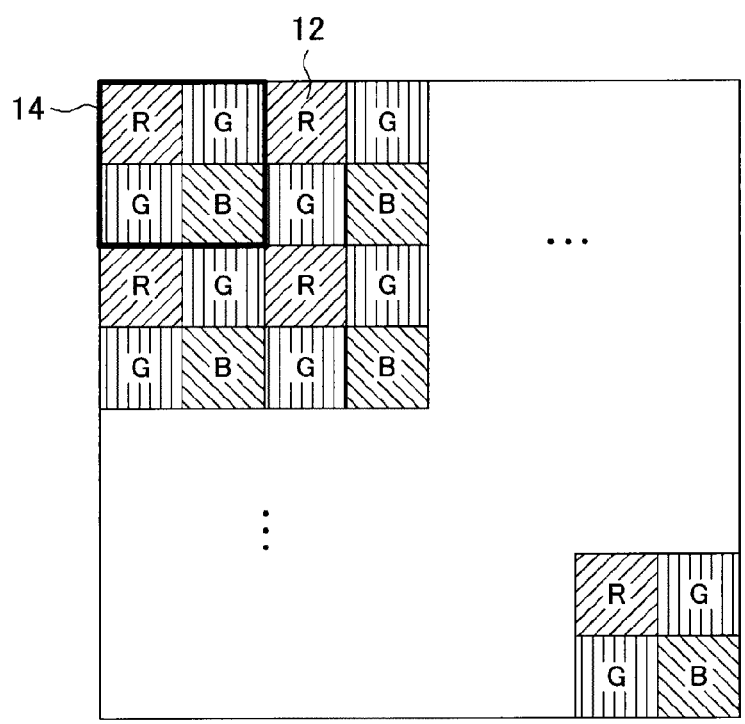
FIG. 3 is a diagram of a Bayer unit.

The multi AWB processor 140 may include a subject brightness calculator (not shown) for calculating a pixel-based subject brightness for all pixels of the first image and for all pixels of the second image. A pixel-based subject brightness can be calculated based on the RGB image signal obtained without light emission from the flash 160 and the RGB image signal obtained with light emission from the flash 160, which can be stored in a memory means, such as the image memory 130. Referring to FIG. 3, the calculation of the pixel-based subject brightness can be performed by considering a Bayer unit 14 in which 4 pixels 12 of R, G, G, and B are combined as 1 set as 1 pixel or generating one pixel for each of color components R, G, and B from 4 pixels of R, G, G, and B in a Bayer image by Bayer color interpolation (demosaicing) processing.

Figure 4:
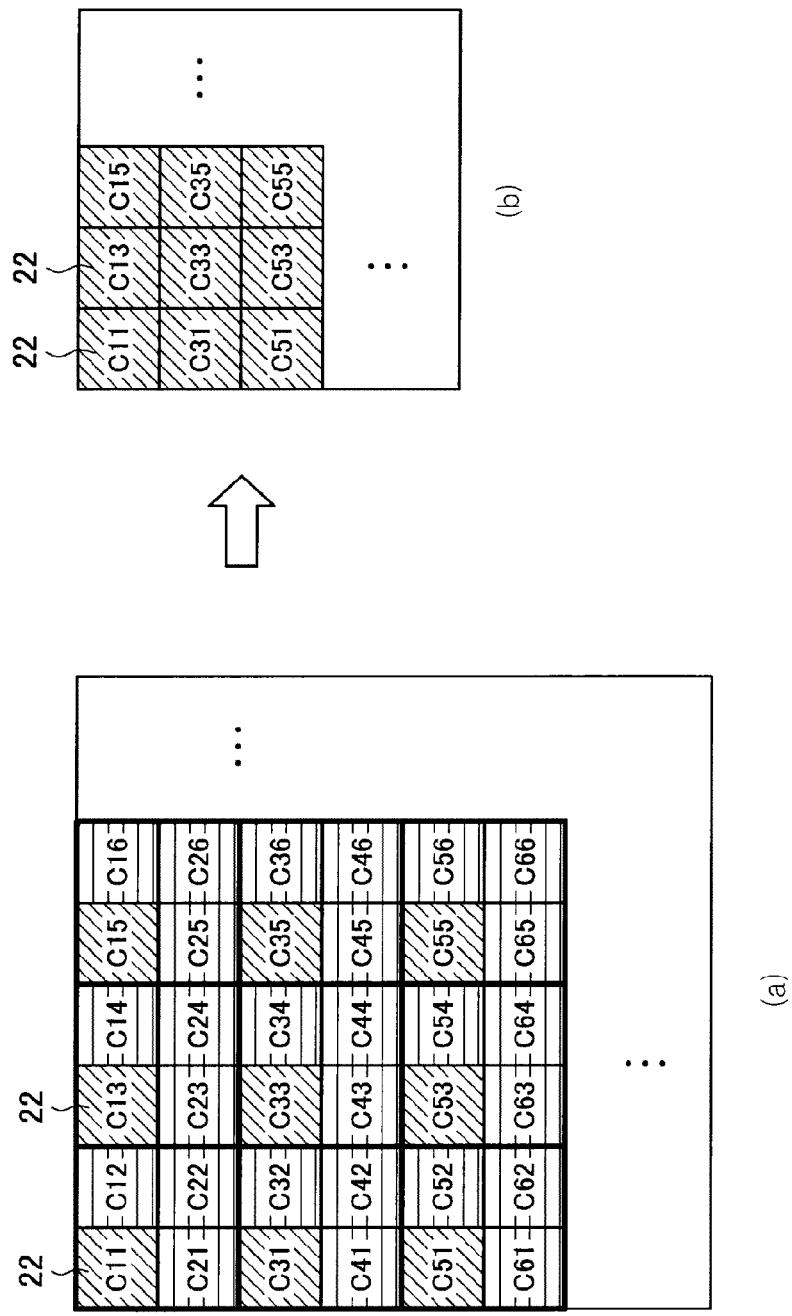
FIG. 4 is a diagram of a down-sampling process.

The multi AWB processor 140 may further include a down-sampling unit (not shown) for down-sampling the second image. The second image, which is a flash image, can be changed to have the same size as the first image, which is a non-flash image, by the down-sampling unit in operation S105. The change to the first image size can be performed by calculating a third image by performing an image down-sampling process on the second image. FIG. 4 is a diagram for describing a down-sampling process. A drawing on the left side of FIG. 4 shows an image before down-sampling. In an embodiment, when the image before down-sampling is down-sampled to a half size vertically and horizontally, the down-sampling process can be a process of converting the before down-sampling image to a small-sized image by extracting one pixel from a Pixel Group (PG) that can include 4 pixels. For example, as shown in FIG. 4, the image before down-sampling is converted to an image as shown on the right side of FIG. 4 by extracting an upper left pixel 22 in each PG. The down-sampling process can be similarly performed when down-sampling an image before down-sampling to a one-third or one-fourth size vertically and horizontally.

When the down-sampling process is performed for the second image, a down-sampling method can be changed according to how the first image, which is a non-flash image, is down-sampled. Although down-sampling in which one pixel (for example, the upper left pixel 22) in each PG remains is shown in FIG. 4, the down-sampling method for the second image may be changed in accordance with a down-sampling method for the first image. For example, when the down-sampling method for the first image is down-sampling performed with a mean value of all pixels in each PG in FIG. 4, the down-sampling process for the second image may also use a method of calculating pixels of the third image by calculating a mean value of all pixels in each PG.

The subject brightness calculator can calculate a subject brightness value in a unit of a pixel for each pixel of the first image and the third image. In Equations 1 and 2, Y denotes a brightness value of each pixel. For example, since a signal value of G is almost the same as a brightness value Y, the brightness value Y can be replaced with the signal value of G. AE is a target brightness signal value of the AE calculator 150 for calculating a light-exposure control value. With this calculation, a first subject brightness value BVlp of the first image and a second subject brightness value BVsp of the third image can be obtained in a unit of a pixel. BVlp and BVsp can denote signal values represented with a logarithm, and a unit system can be based on APEX values.

$$BVlp = \log_2\left(\frac{Y}{AE}\right) \quad (1)$$

$$BVsp = \log_2\left(\frac{Y}{AE}\right) \quad (2)$$

If a light-exposure control value when capturing the first image shown in FIG. 6 is not identical to a light-exposure control value when capturing the second image shown in FIG. 5, a difference between the light-exposure control values can be considered. The light-exposure control values can have a relationship as shown in Equation 3. TV denotes a shutter speed, AV denotes an iris value, SV denotes sensitivity, and BV denotes a subject brightness value, which are represented with APEX values.

$$TV+AV=SV+BV \quad (3)$$

The multi AWB processor 140 may comprise a light-exposure control value calculator (not shown) that calculates a first light-exposure control value BVl for the first image and a second light-exposure control value BVs for the second image. The first light-exposure control value BVl can be obtained by using Equation 3 to calculate a subject brightness value BV from TV, AV, and SV for the case without light emission from the flash 160. The second light-exposure control value BVs can be obtained by using Equation 3 to calculate a subject brightness value BV from TV, AV, and SV for the case with light emission from the flash 160. The first light-exposure control value BVl can be obtained using light-exposure control values TVl, AVl, and SVl for the first image as shown in Equation 4, and the second light-exposure control value BVs can be obtained using light-exposure control values TVs, AVs, and SVs for the second image as shown in Equation 5.

$$BVl=TVl+AVl-SVl \quad (4)$$

$$BVs=TVs+AVs-SVs \quad (5)$$

The image pickup device 108 can acquire the second image by performing photographing with the second light-exposure control value. An iris value of the second light-exposure control value can be updated to an iris value of the first light-exposure control value, which can be calculated by a light-exposure control value calculator.

The multi AWB processor 140 may comprise a light-exposure control value difference calculator (not shown) that calculates a light-exposure control value difference BVdiff. The light-exposure control value difference BVdiff can be a difference between the first light-exposure control value BVl and the second light-exposure control value BVs. The light-exposure control value difference BVdiff between BVl and BVs can be obtained from Equations 4 and 5, respectively, can be obtained using Equation 6.

$$BVdiff=BVs-BVl \quad (6)$$

Figure 7:
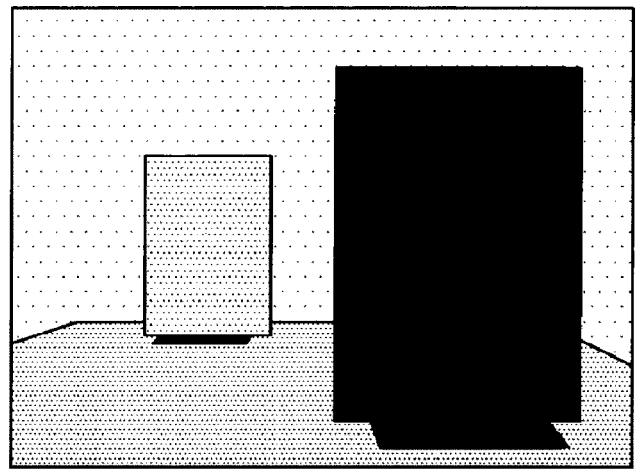
FIG. 7 illustrates an image obtained by applying a light-exposure control value difference to a non-flash image.

A non-flash subject brightness difference BVlpdiff can be obtained using Equation 7 by considering the pixel-based first subject brightness value BVlp of the first image and the light-exposure control value difference BVdiff between the light-exposure control values. An image in which the entire image has proper brightness can be obtained as shown in FIG. 7 by applying Equation 7 to a non-flash image captured with proper light-exposure as shown in FIG. 6.

$$BVlpdiff=BVlp-BVdiff \quad (7)$$

The multi AWB processor 140 can obtain a flash image subject brightness difference BVdiffp between the second subject brightness value BVsp of the third image and the non-flash subject brightness difference BVlpdiff in a unit of a pixel by using Equation 8. The multi AWB processor 140 may comprise a subject brightness difference calculator (not shown) that calculates the flash image subject brightness difference BVdiffp.

$$BVdiffp=BVsp-BVlpdiff \quad (8)$$

A flash reflection intensity calculator 141 can obtain a first flash reflection intensity Ratio for each pixel of the third image, which is a flash image, from the flash image subject brightness difference BVdiffp obtained using Equation 8 in operation S106. A light intensity Lf of the third image can be obtained using Equation 9.

$$Lf=2^{BVdiffp} \quad (9)$$

According to another embodiment, the subject brightness difference calculator can calculate a subject brightness difference which is a difference between the first subject brightness for all pixels of the first image and the second subject brightness for all pixels of the third image, and the flash reflection intensity calculator 141 can obtain the first flash reflection intensity Ratio for each pixel of the third image from the subject brightness difference.

The first flash reflection intensity Ratio can be obtained from the light intensity Lf of the third image by using Equation 10, when a surrounding light intensity of the first image, which is a non-flash image, is 1. The first flash reflection intensity Ratio can be calculated with respect to all pixels of the third image, in operation S107.

$$\text{Ratio} = \frac{(LF-1)}{Lf} \quad (10)$$

A first flash reflection intensity interpolator 142 can perform interpolation based on a brightness value of each pixel of the third image and the first flash reflection intensity Ratio obtained using Equation 10 and can obtain a second flash reflection intensity for each pixel of the third image in operations S108 and S109. For example, since a signal value of G of each pixel is almost the same as a brightness value, the signal value of G may be used instead of the brightness value. The purpose of calculating the second flash reflection intensity through interpolation of the first flash reflection intensity interpolator 142 is to minimize the possibility of wrongly calculating the first flash reflection intensity Ratio because the first image and the third image have a possible mismatch due to an influence, such as a camera shake, or because their capturing timings are not the same. According to an exemplary embodiment, the influence of a mismatch can be reduced by the first flash reflection intensity interpolator 142 interpolating a pixel to be interpolated based on neighboring pixel values.

Referring to FIG. 8, if, for example, a pixel to be interpolated in the third image is C55, pixels C15, C95, C51, and C59 located in upper, lower, left, and right sides, respectively, can be interpolation source pixels. Although pixels separated by 1 pixel from the to be interpolated pixel C55 are interpolation source pixels in the embodiment of FIG. 8, other pixels can be the interpolation source pixels. For example, interpolation source pixels may be adjacent pixels C35, C75, C53, and C57 located at the upper, lower, left, and right sides, respectively, or pixels separated by 2 or more pixels from the pixel C55 to be interpolated at the upper, lower, left, and right sides can be the interpolation source pixels.

Figure 9:
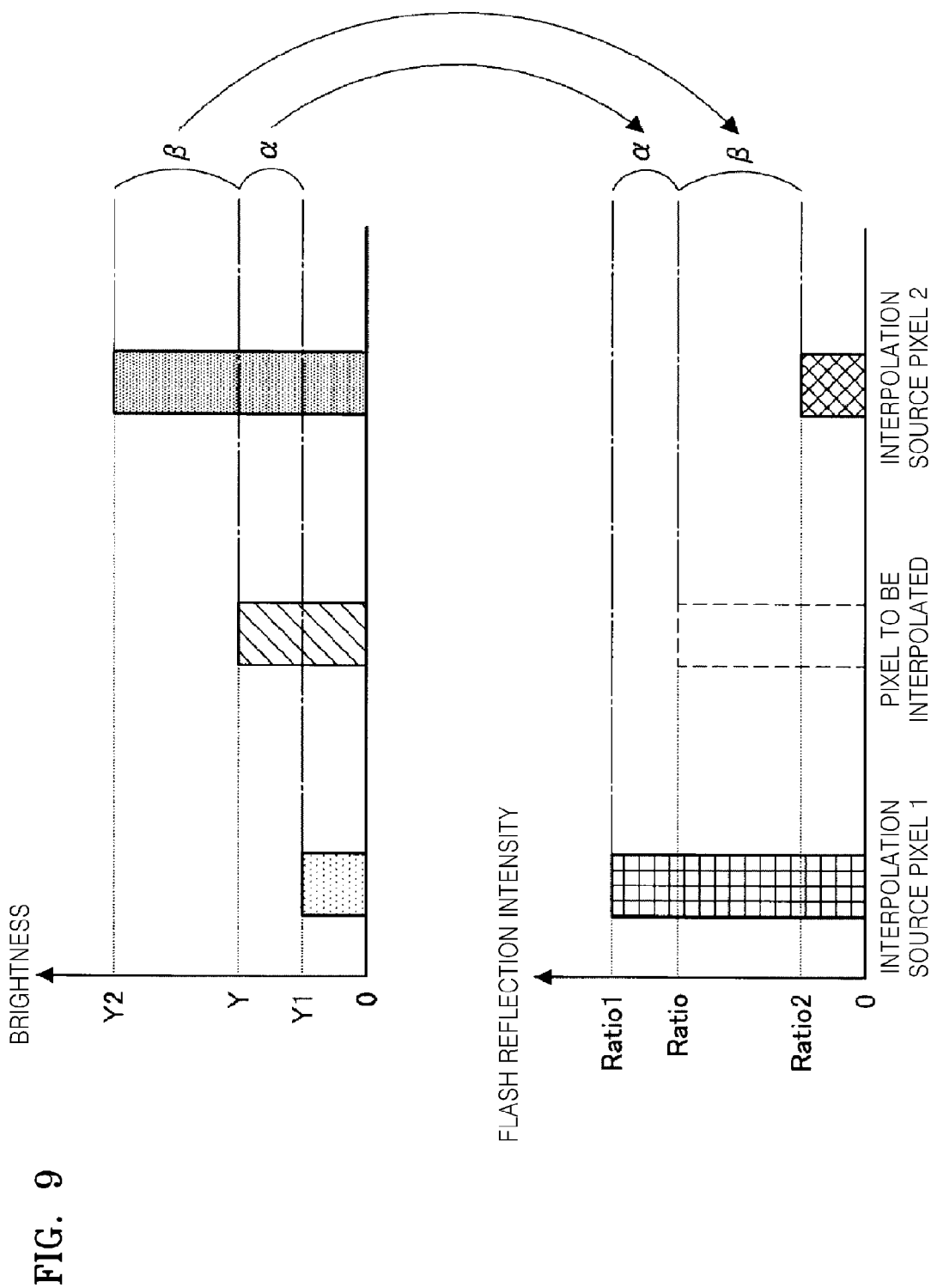
FIG. 9 illustrates graphs of an interpolation process.

Referring to Equation 11, brightness values Y1 and Y2 of interpolation source pixels and first flash reflection intensity Ratio1 and Ratio2 can be already known values, and a brightness value Y of a pixel to be interpolated can also be an already known value. The second flash reflection intensity of a pixel to be interpolated in the third image can be obtained from these values using Equation 11. A conceptual diagram of this interpolation is illustrated in FIG. 9.

$$\text{Ratio} = (\text{Ratio2} - \text{Ratio1}) * \frac{(Y-Y1)}{(Y2-Y1)} + \text{Ratio1} \quad (11)$$

Since Equation 11 can correspond to interpolation between two points, a flash reflection intensity Ratio_v in upper and lower directions and a flash reflection intensity Ratio_h in left and right directions can be obtained by using Equation 11. A second flash reflection intensity Ratio_result can be calculated from a mean value of the flash reflection intensity Ratio_v and the flash reflection intensity Ratio_h by using Equation 12.

$$\text{Ratio\_result} = \frac{(\text{Ratio\_h} + \text{Ratio\_v})}{2} \quad (12)$$

Alternatively, instead of calculating a mean value as in Equation 12, interpolation in the upper and lower directions may be separated from interpolation in the left and right directions so that the interpolation in the left and right directions may be performed for all pixels after the interpolation in the upper and lower directions is performed for all pixels.

Figure 10:
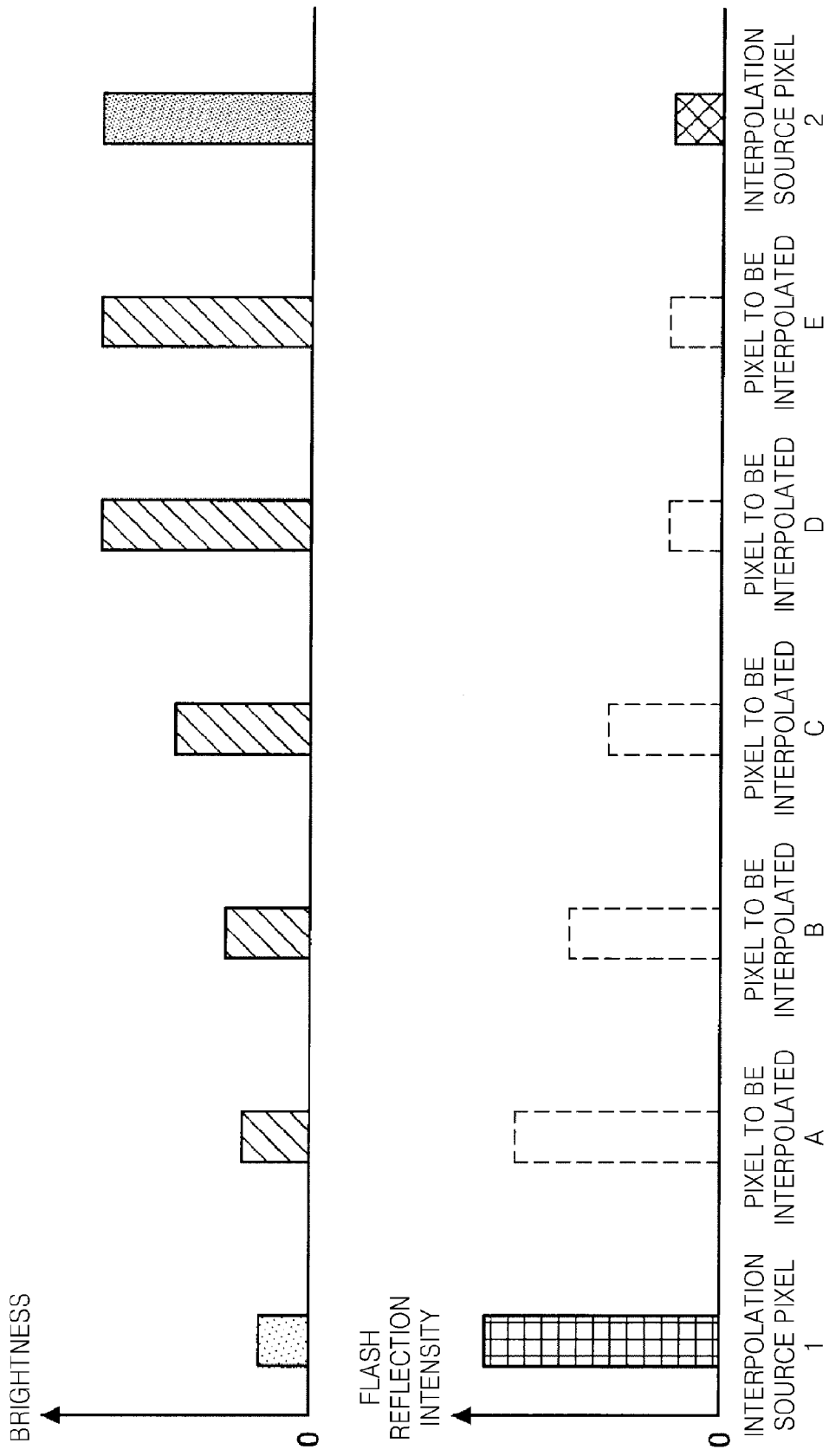
FIG. 10 illustrates graphs of an interpolation process.

Referring to FIG. 10, when this interpolation is performed, a proper flash reflection intensity can be calculated by properly performing interpolation even when several pixels A, B, C, D, and E to be interpolated exist between interpolation source pixels 1 and 2 and the brightness values of the pixels A, B, C, D, and E to be interpolated are frequently changed and/or when a boundary in which a large color temperature difference exists, such as, when a subject has an edge.

An image size of the third image can be magnified to an image size of the second image. As shown in FIG. 11, a second flash reflection intensity interpolator 143 can perform interpolation using Equations 11 and 12 from already known brightness values of down-sampled pixels based on the second image by referring to pixels in the upper, lower, left, and right directions in operation S110. Likewise, a third flash reflection intensity can be calculated by performing interpolation for all pixels in the image size of the second image in operation S111.

The color balance calculator 144 can obtain a color balance CB of a corresponding pixel by performing linear interpolation of a color balance CBf of the flash light and a color balance CBe of the surrounding light based on the third flash reflection intensity in operation S112. The color balance CB can be independently obtained for R and B.

$$CBr=(\text{Ratio}*CBfr)+((1-\text{Ratio})*CBer)$$

$$CBb=(\text{Ratio}*CBfb)+((1-\text{Ratio})*CBeb) \quad (13)$$

A white balance gain calculator 145 calculates white balance gains WBGainR and WBGainB of a corresponding pixel by using Equation 14 from the color balances of R and NB obtained from Equation 13 in operation S113.

$$WBGainR = \frac{1}{CBr} \quad (14)$$

$$WBGainB = \frac{1}{CBb}$$

Equations 13 and 14 are applied to all pixels in operation S114. Accordingly, even if an image size of a non-flash image is different from an image size of a flash image, a proper white balance gain can be obtained in a unit of a pixel for a scene in which flash light and surrounding light are mixed.

Proper white balance processing can be performed by applying a white balance gain to a corresponding pixel of the flash image by the white balance controller 126 after calculating white balance gains of all pixels.

Conventionally, when an image size of a non-flash image is different from an image size of a flash image, a proper white balance gain cannot be obtained. According to an exemplary embodiment of the present invention, a proper white balance gain can be obtained in a unit of a pixel for a scene in which flash light and surrounding light are mixed by performing interpolation based on brightness values of pixels even for a non-flash image having a different image size.

That is, the entire image can be adjusted with a proper white balance by properly performing interpolation for down-sampled pixels in a method of calculating a proper white balance gain in a unit of a pixel by comparing a non-flash image, such as a live-view image, having a small number of pixels with a flash image, such as a main captured image having a full size and a large number of pixels.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation on the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as the semiconductor memory 210 illustrated in FIG. 2, random-access memory (RAM), read-only memory (ROM), CD-ROMs, DVDs, magnetic tapes, hard disks, floppy disks, and optical storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implement using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical." It will also be recognized that the terms "comprises," "comprising," "includes," "including," "has," and "having," as used herein, are specifically intended to be read as open-ended terms of art. The use of the terms "a" and "an" and "the" and similar references in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image pickup apparatus comprising:
an image pickup unit that acquires a first image without a flash by a down-sampling process and acquires a second image with the flash, wherein the second image has a larger number of pixels than the first image;
a down-sampling unit that acquires a third image by performing a down-sampling process on the second image in such a way that a size of the second image is the same as a size of the first image;
a subject brightness calculator that calculates a first subject brightness for all pixels of the first image and calculates a second subject brightness for all pixels of the third image;
a subject brightness difference calculator that calculates a subject brightness difference, wherein the subject brightness difference corresponds to a difference between the first subject brightness for all the pixels of the first image and the second subject brightness for all the pixels of the third image;
a flash reflection intensity calculator that calculates a first flash reflection intensity in a unit of a pixel from the subject brightness difference;
a first flash reflection intensity interpolator that calculates a second flash reflection intensity through interpolation to reduce an influence of a position mismatch between the first image and the third image for the first flash reflection intensity in a unit of a pixel by using pixel-based brightness values of the third image;
a second flash reflection intensity interpolator that calculates a third flash reflection intensity through interpolation to magnify a size of the data corresponding to the second flash reflection intensity to correspond to the size of the second image wherein the interpolation is performed using pixel-based brightness values of the second image; and
a white balance gain calculator that calculates a white balance gain in a unit of a pixel from the third flash reflection intensity.

2. The image pickup apparatus of claim 1, wherein the image pickup apparatus further comprises a white balance controller that controls a white balance in a unit of a pixel by applying the white balance gain to all the pixels of the second image in a unit of a pixel.

3. The image pickup apparatus of claim 1, further comprising:
a light-exposure control value calculator that calculates a first light-exposure control value for the first image and a second light-exposure control value for the second image; and
a light-exposure control value difference calculator that calculates a light-exposure control value difference, wherein the light-exposure control value difference corresponds to a difference between the first light-exposure control value and the second light-exposure control value, for all pixels,
wherein the image pickup unit acquires the first image by performing photographing based on the first light-exposure control value and acquires the second image by performing photographing based on the second light-exposure control value.

4. The image pickup apparatus of claim 3, wherein the first light-exposure control value and the second light-exposure control value are independently calculated by the light-exposure control value calculator.

5. The image pickup apparatus of claim 3, wherein the image pickup unit acquires the second image by performing photographing with the second light-exposure control value and wherein an iris value of the second light-exposure control value is updated to correspond to an iris value of the first light-exposure control value calculated by the light-exposure control value calculator.

6. The image pickup apparatus of claim 1, further comprising a color balance calculator that calculates a color balance of a corresponding pixel by linear-interpolating a color balance with respect to surrounding light and a color balance with respect to flash light based on the first flash reflection intensity calculated by the flash reflection intensity calculator,
wherein the white balance gain calculator calculates the white balance gain based on the color balance of the corresponding pixel, the color balance with respect to the surrounding light, and the color balance with respect to the flash light.

7. The image pickup apparatus of claim 1, wherein the first flash reflection intensity interpolator calculates the second flash reflection intensity based on brightness values of interpolation source pixels located at upper, lower, left, and right sides of and centered around a pixel to be interpolated and the first flash reflection intensity.

8. The image pickup apparatus of claim 7, wherein, for the first flash reflection intensity interpolator, a distance between the pixel to be interpolated and each of the interpolation source pixels located at the upper, lower, left, and right sides of the pixel to be interpolated is constant.

9. An image pickup method comprising:
acquiring, using an image pickup device, a first image without a flash by a down-sampling process and acquiring a second image with the flash, wherein the second image has a larger number of pixels than the first image;
acquiring a third image by performing a down-sampling process on the second image in such a way that a size of the second image is the same as a size of the first image;
calculating, using a processor, a first subject brightness for all pixels of the first image and calculating a second subject brightness for all pixels of the third image;
calculating a subject brightness difference, wherein the subject brightness difference corresponds to a difference between the first subject brightness for all the pixels of the first image and the second subject brightness for all the pixels of the third image;
calculating a first flash reflection intensity in a unit of a pixel from the subject brightness difference;
calculating a second flash reflection intensity through interpolation to reduce an influence of a position mismatch between the first image and the third image for the first flash reflection intensity in a unit of a pixel by using pixel-based brightness values of the third image;
calculating a third flash reflection intensity through interpolation to magnify a size of the data corresponding to the second flash reflection intensity to correspond to the size of the second image wherein the interpolation is performed using pixel-based brightness values of the second image; and
calculating a white balance gain in a unit of a pixel from the third flash reflection intensity.

10. An image pickup apparatus comprising:
an image pickup unit that acquires a first image without a flash and a second image with the flash, wherein the second image has a larger number of pixels than the first image;
a down-sampling unit that generates a third image by down-sampling the second image to a size of the first image;
a brightness difference calculator that calculates a brightness difference between the first image and the third image;
a flash reflection intensity calculator that calculates a first flash reflection intensity in a unit of a pixel from the brightness difference;
a first flash reflection intensity interpolator that calculates a second flash reflection intensity through interpolation to reduce an influence of a position mismatch between the first image and the third image for the first flash reflection intensity;
a second flash reflection intensity interpolator that calculates a third flash reflection intensity through interpolation to magnify a size of the data corresponding to the second flash reflection intensity to correspond to the size of the second image wherein the interpolation is performed using pixel-based brightness values of the second image; and
a white balance gain calculator that calculates a white balance gain based on the third flash reflection intensity.

11. The image pickup apparatus of claim 10,
wherein the white balance gain calculator calculates the white balance gain based on the second flash reflection intensity.

12. The image pickup apparatus of claim 10, further comprising a white balance controller that controls a white balance in a unit of a pixel by applying the white balance gain to all pixels of the second image in a unit of a pixel.

13. An image pickup method comprising:
acquiring, using an image pickup device, a first image without a flash and a second image with the flash, wherein the second image has a larger number of pixels than the first image;
generating a third image by down-sampling the second image to a size of the first image;
calculating, using a processor, a brightness difference between the first image and the third image;
calculating a first flash reflection intensity in a unit of a pixel from the brightness difference;
calculating a second flash reflection intensity through interpolation to reduce an influence of a position mismatch between the first image and the third image for the first flash reflection intensity;
calculating a third flash reflection intensity through interpolation to magnify a size of the data corresponding to the second flash reflection intensity to correspond to the size of the second image wherein the interpolation is performed using pixel-based brightness values of the second image; and
calculating a white balance gain based on the third flash reflection intensity.

14. The image pickup method of claim 13,
wherein the calculating of the white balance gain includes calculating the white balance gain based on the second flash reflection intensity.

15. The image pickup method of claim 13, further comprising controlling a white balance in a unit of a pixel by applying the white balance gain to all pixels of the second image in a unit of a pixel.

* * * * *